United States Patent
Amit et al.

(10) Patent No.: US 9,953,006 B2
(45) Date of Patent: Apr. 24, 2018

(54) LOCK-FREE PROCESSING OF STATELESS PROTOCOLS OVER RDMA

(71) Applicant: INTERNATIONAL BUSINESS MACHINES CORPORATION, Armonk, NY (US)

(72) Inventors: Jonathan Amit, Omer (IL); Vladislav Drouker, Holon (IL); Gal Rosen, Petach Tikva (IL); Saar Ron, Kiryat Ono (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 160 days.

(21) Appl. No.: 14/747,231

(22) Filed: Jun. 23, 2015

(65) Prior Publication Data

US 2016/0378712 A1    Dec. 29, 2016

(51) Int. Cl.
*G06F 15/173*    (2006.01)
*G06F 13/16*    (2006.01)
(Continued)

(52) U.S. Cl.
CPC ........ *G06F 15/17331* (2013.01); *G06F 9/546* (2013.01); *G06F 13/1642* (2013.01);
(Continued)

(58) Field of Classification Search
None
See application file for complete search history.

(56) References Cited

U.S. PATENT DOCUMENTS 6,360,220 B1    3/2002 Forin
6,718,370 B1 *  4/2004 Coffman ............. H04L 12/5693
                                              709/212
(Continued)

FOREIGN PATENT DOCUMENTS

WO    WO 2008057833 A2 *  5/2008  ......... G06F 12/0835
WO    2009012572 A2    1/2009

OTHER PUBLICATIONS

Kumar et al., "Lock-Free Asynchronous Rendevous Design for MPI Point-to-Point Communication", Network-Based Computing Laboratory, Dept. of Computer Science and Engineering, Springer, 2008.

*Primary Examiner* — Steven Snyder
(74) *Attorney, Agent, or Firm* — Griffiths & Seaton PLLC

(57) ABSTRACT

Methods, systems, and computer storage mediums including a computer program product for managing data in a computing network are provided. One method includes registering a plurality of buffers with a work queue in a server and assigning ownership to each of the plurality of buffers to a different working thread in a plurality of working threads. The method further includes continuously polling, by a polling thread, the work queue to determine when work requests are received by the work queue, upon receipt of each work request, determining which buffer among the plurality of buffers each work request is associated, and performing each work request on each respective associated buffer by a working thread among the plurality of working threads that owns each respective associated buffer. One system includes a processor for performing the above method and one computer storage medium includes computer code for performing the above method.

18 Claims, 4 Drawing Sheets

(51) Int. Cl.
  *G06F 13/28*  (2006.01)
  *G06F 13/22*  (2006.01)
  *H04L 29/08*  (2006.01)
  *G06F 9/54*  (2006.01)

(52) U.S. Cl.
  CPC .......... *G06F 13/1673* (2013.01); *G06F 13/22* (2013.01); *G06F 13/28* (2013.01); *H04L 67/1029* (2013.01); *H04L 67/1097* (2013.01); *G06F 2209/5018* (2013.01)

(56) References Cited

U.S. PATENT DOCUMENTS

| | | | | |
|---|---|---|---|---|
| 6,754,736 B1* | 6/2004 | Ogawa | .................... | G06F 9/526 710/39 |
| 7,533,197 B2* | 5/2009 | Leonard | .................... | G06F 13/28 709/212 |
| 7,742,473 B2 | 6/2010 | Adams et al. | | |
| 7,782,905 B2* | 8/2010 | Keels | .................... | H04L 1/0061 370/474 |
| 7,889,762 B2* | 2/2011 | Keels | .................... | H04L 49/9094 370/464 |
| 8,037,154 B2 | 10/2011 | Biran et al. | | |
| 8,458,280 B2* | 6/2013 | Hausauer | .................... | H04L 47/6265 709/212 |
| 8,527,672 B2* | 9/2013 | Blocksome | .................... | G06F 13/28 710/22 |
| 8,650,338 B2* | 2/2014 | Blocksome | .................... | G06F 13/28 710/22 |
| 8,650,569 B2 | 2/2014 | Pope et al. | | |
| 8,699,521 B2* | 4/2014 | Keels | .................... | H04L 49/9094 370/464 |
| 8,732,726 B2* | 5/2014 | Archer | .................... | G06F 15/17318 719/312 |
| 8,769,036 B2 | 7/2014 | Frey et al. | | |
| 9,047,150 B2* | 6/2015 | Blocksome | .................... | G06F 15/16 |
| 9,052,974 B2* | 6/2015 | Blocksome | .................... | G06F 15/16 |
| 9,075,759 B2* | 7/2015 | Blocksome | .................... | G06F 15/16 |
| 9,081,739 B2* | 7/2015 | Blocksome | .................... | G06F 15/16 |
| 9,250,950 B2* | 2/2016 | Archer | .................... | G06F 9/46 |
| 9,276,993 B2* | 3/2016 | Keels | .................... | H04L 49/9094 |
| 9,448,864 B2* | 9/2016 | Kim | .................... | G06F 9/4831 |
| 9,525,737 B2* | 12/2016 | Friedman | .................... | H04L 67/2842 |
| 2002/0156897 A1* | 10/2002 | Chintalapati | .................... | H04L 29/06 709/227 |
| 2005/0220128 A1* | 10/2005 | Tucker | .................... | G06F 13/28 370/412 |
| 2006/0101081 A1* | 5/2006 | Lin | .................... | G06F 17/30362 |
| 2006/0230119 A1* | 10/2006 | Hausauer | .................... | H04L 67/1097 709/216 |
| 2007/0165672 A1* | 7/2007 | Keels | .................... | H04L 1/0061 370/474 |
| 2007/0208820 A1* | 9/2007 | Makhervaks | .................... | H04L 67/10 709/212 |
| 2008/0043750 A1* | 2/2008 | Keels | .................... | H04L 49/9094 370/395.52 |
| 2008/0109570 A1* | 5/2008 | Leonard | .................... | G06F 13/28 710/22 |
| 2009/0106771 A1* | 4/2009 | Benner | .................... | H04L 67/1097 719/313 |
| 2012/0216216 A1* | 8/2012 | Lopez Taboada | ...... | G06F 9/546 719/314 |
| 2013/0046811 A1* | 2/2013 | Park | .................... | H04L 65/605 709/203 |
| 2013/0111059 A1 | 5/2013 | Pope et al. | | |
| 2013/0124666 A1* | 5/2013 | Archer | .................... | G06F 15/17318 709/212 |
| 2014/0173604 A1* | 6/2014 | Archer | .................... | G06F 9/46 718/100 |
| 2015/0134841 A1* | 5/2015 | Lojewski | .................... | H04L 69/321 709/228 |
| 2015/0242254 A1* | 8/2015 | Kim | .................... | G06F 9/4831 711/151 |
| 2015/0254003 A1* | 9/2015 | Lee | .................... | G11C 14/0018 711/103 |
| 2016/0308968 A1* | 10/2016 | Friedman | .................... | H04L 67/2842 |
| 2017/0054824 A1* | 2/2017 | Friedman | .................... | H04L 67/2842 |

* cited by examiner

LOCK-FREE PROCESSING OF STATELESS PROTOCOLS OVER RDMA

BACKGROUND OF THE INVENTION

Field of the Invention

The present invention relates generally to data storage, and more particularly to, lock-free processing of stateless protocols over Remote Direct Memory Access (RDMA).

Description of the Related Art

In high-speed networking and in high-performance computing environments, remote direct memory access (RDMA) is expected to become increasingly invaluable. For example, data centers and server farms will rely on remote direct memory access to coordinate computing devices connected by networks running packet protocols, such as transmission control protocol (TCP). In computing, remote direct memory access is a direct memory access from the user application memory of one data processing system into the user application memory of another data processing system without involving either data processing system's operating system. As a result, remote direct memory access supports zero-copy networking by enabling a network input/output adapter to transfer data directly to or from user application memory, eliminating the need to copy data between user application memory and the data buffers in the operating system. Such transfers require little to no work to be done by central processing units (CPUs), caches, or context switches, and transfers may continue in parallel with other system operations. When an application performs a remote direct memory access Read or Write request, the application data is delivered directly to the network, reducing latency and enabling faster data transfer. This permits high-throughput, low-latency networking, which is especially useful in parallel computer clusters.

SUMMARY OF THE INVENTION

Various embodiments provide methods for managing data in a computing environment including one or more host computing devices coupled to a storage system comprising a server and storage elements via a network. One method comprises registering a plurality of buffers with a work queue in the server and assigning ownership to each of the plurality of buffers to a different working thread in a plurality of working threads. The method further comprises continuously polling, by a polling thread in the server, the work queue to determine when work requests are received by the work queue, upon receipt of each work request, determining which buffer among the plurality of buffers each work request is associated, and performing each work request on each respective associated buffer by a working thread among the plurality of working threads that owns each respective associated buffer.

Other embodiments provide systems for managing data in a computing environment. One system comprises one or more host computing devices and a storage system comprising a server and storage elements coupled to each of the host computing devices via a network. The server comprises a plurality of buffers and a work queue coupled to a processor. The processor configured for registering the plurality of buffers with the work and assigning ownership to each of the plurality of buffers to a different working thread in a plurality of working threads. The processor is further configured for continuously polling, by a polling thread, the work queue to determine when work requests are received by the work queue, upon receipt of each work request, determining which buffer among the plurality of buffers each work request is associated, and performing each work request on each respective associated buffer by a working thread among the plurality of working threads that owns each respective associated buffer.

Physical computer storage mediums comprising a computer program product for managing data in a computing environment including one or more host computing devices coupled to a storage system comprising a server and storage elements via a network are also provided. One physical computer storage medium comprises computer code for registering a plurality of buffers with a work queue in the server and computer code for assigning ownership to each of the plurality of buffers to a different working thread in a plurality of working threads.

The physical computer storage medium further comprises computer code for continuously polling, by a polling thread in the server, the work queue to determine when work requests are received by the work queue, computer code for, upon receipt of each work request, determining which buffer among the plurality of buffers each work request is associated, and computer code for performing each work request on each respective associated buffer by a working thread among the plurality of working threads that owns each respective associated buffer.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Various embodiments provide methods, systems, and/or physical computer storage mediums comprising a computer program product for managing data in a computing environment including one or more host computing devices coupled to a storage system comprising a server and storage elements via a network. One method comprises registering a plurality of buffers with a work queue in the server and assigning ownership to each of the plurality of buffers to a different working thread in a plurality of working threads. The method further comprises continuously polling, by a polling thread in the server, the work queue to determine when work requests are received by the work queue, upon receipt of each work request, determining which buffer among the plurality of buffers each work request is associated, and performing each work request on each respective associated buffer by a working thread among the plurality of working threads that owns each respective associated buffer.

One system comprises one or more host computing devices and a storage system comprising a server and storage elements coupled to each of the host computing devices via a network. The server comprises a plurality of buffers and a work queue coupled to a processor. The processor configured for registering the plurality of buffers with the work and assigning ownership to each of the plurality of buffers to a different working thread in a plurality of working threads. The processor is further configured for continuously polling, by a polling thread, the work queue to determine when work requests are received by the work queue, upon receipt of each work request, determining which buffer among the plurality of buffers each work request is associated, and performing each work request on each respective associated buffer by a working thread among the plurality of working threads that owns each respective associated buffer.

A physical computer storage medium comprises computer code for registering a plurality of buffers with a work queue in the server and computer code for assigning ownership to each of the plurality of buffers to a different working thread in a plurality of working threads.

The physical computer storage medium further comprises computer code for continuously polling, by a polling thread in the server, the work queue to determine when work requests are received by the work queue, computer code for, upon receipt of each work request, determining which buffer among the plurality of buffers each work request is associated, and computer code for performing each work request on each respective associated buffer by a working thread among the plurality of working threads that owns each respective associated buffer.

Figure 1:
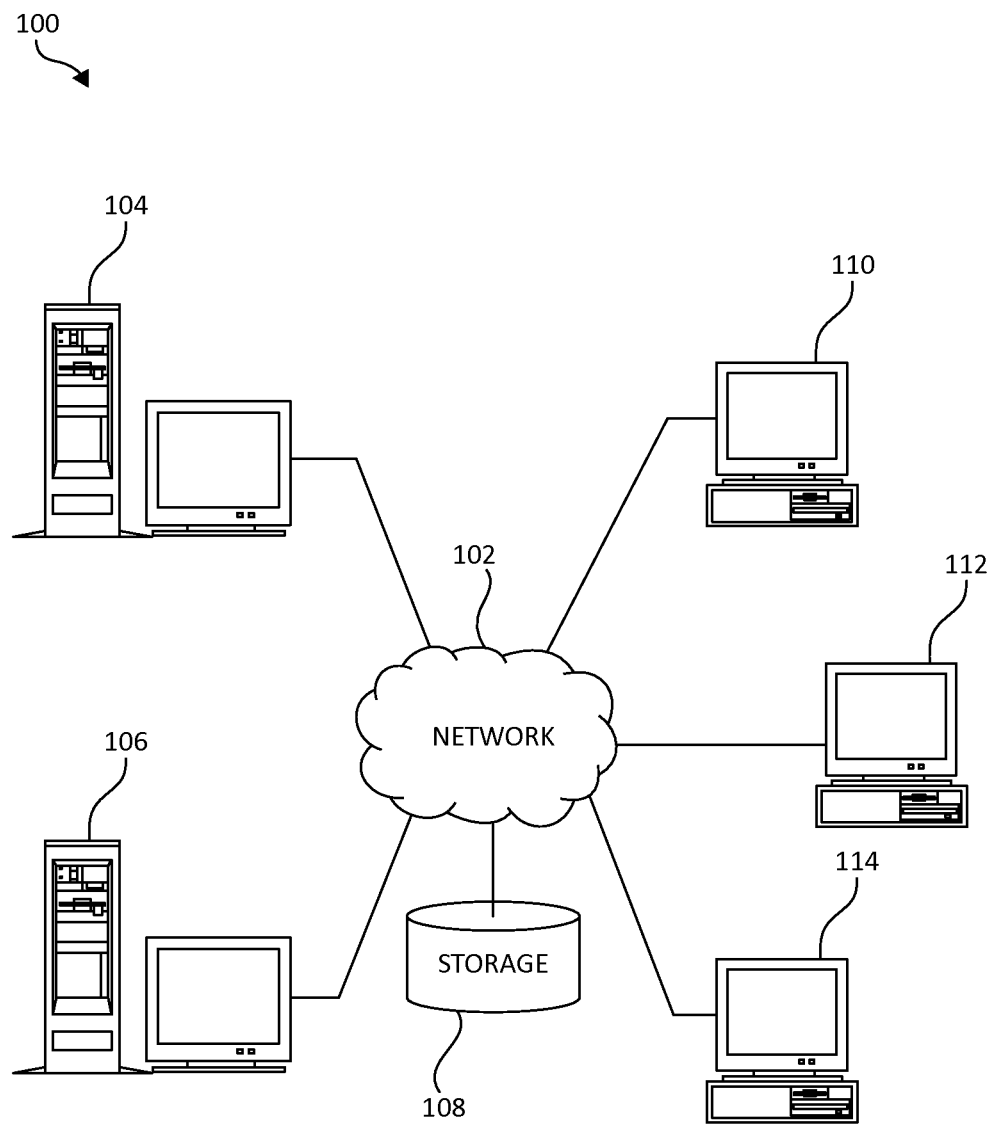
FIG. 1 is a block diagram of a data processing network in which illustrative embodiments may be implemented.
Figure 2:
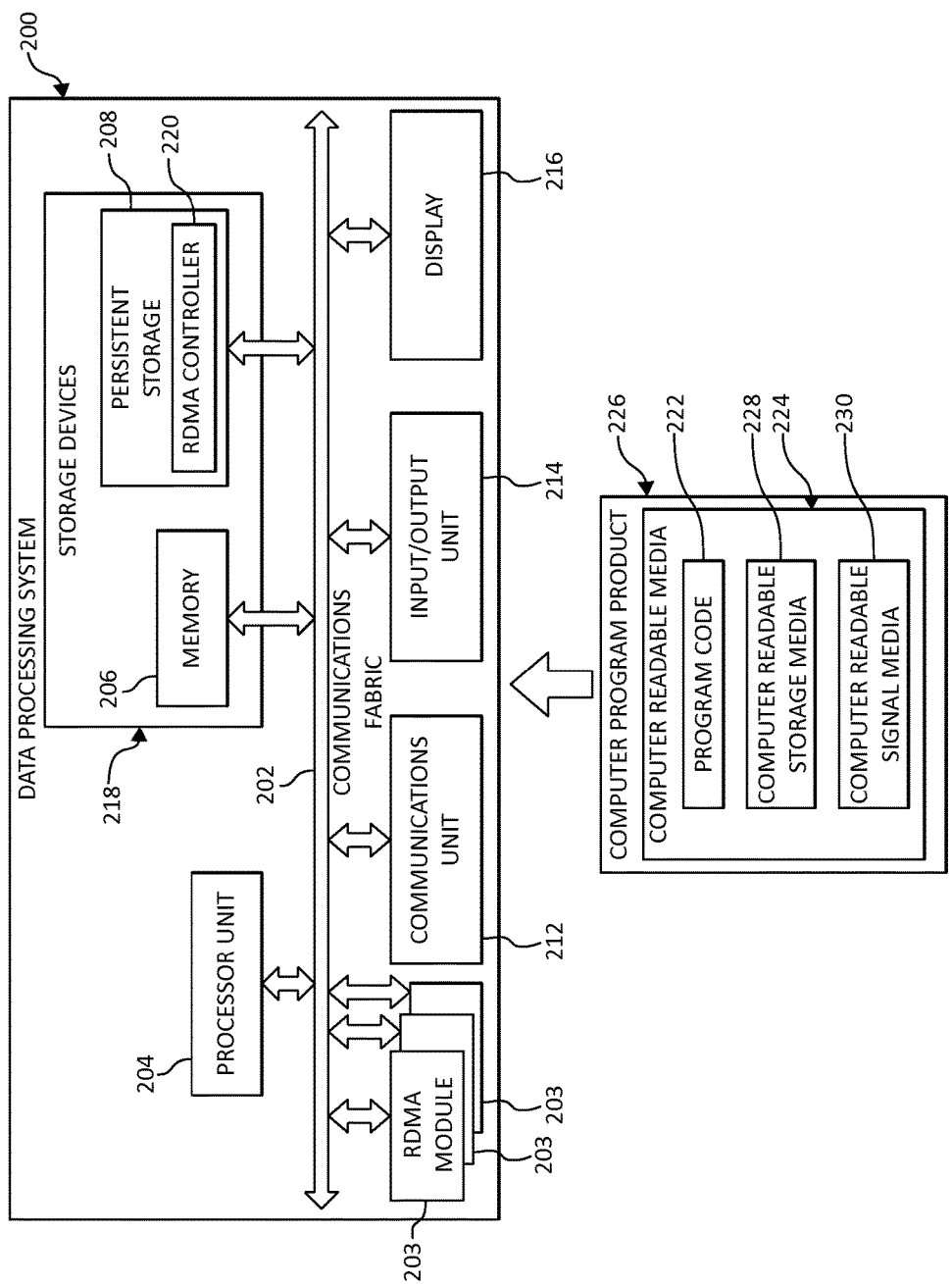
FIG. 2 is a block diagram of one embodiment of a data processing system that forms a portion of the data processing network of FIG. 1.
Figure 3:
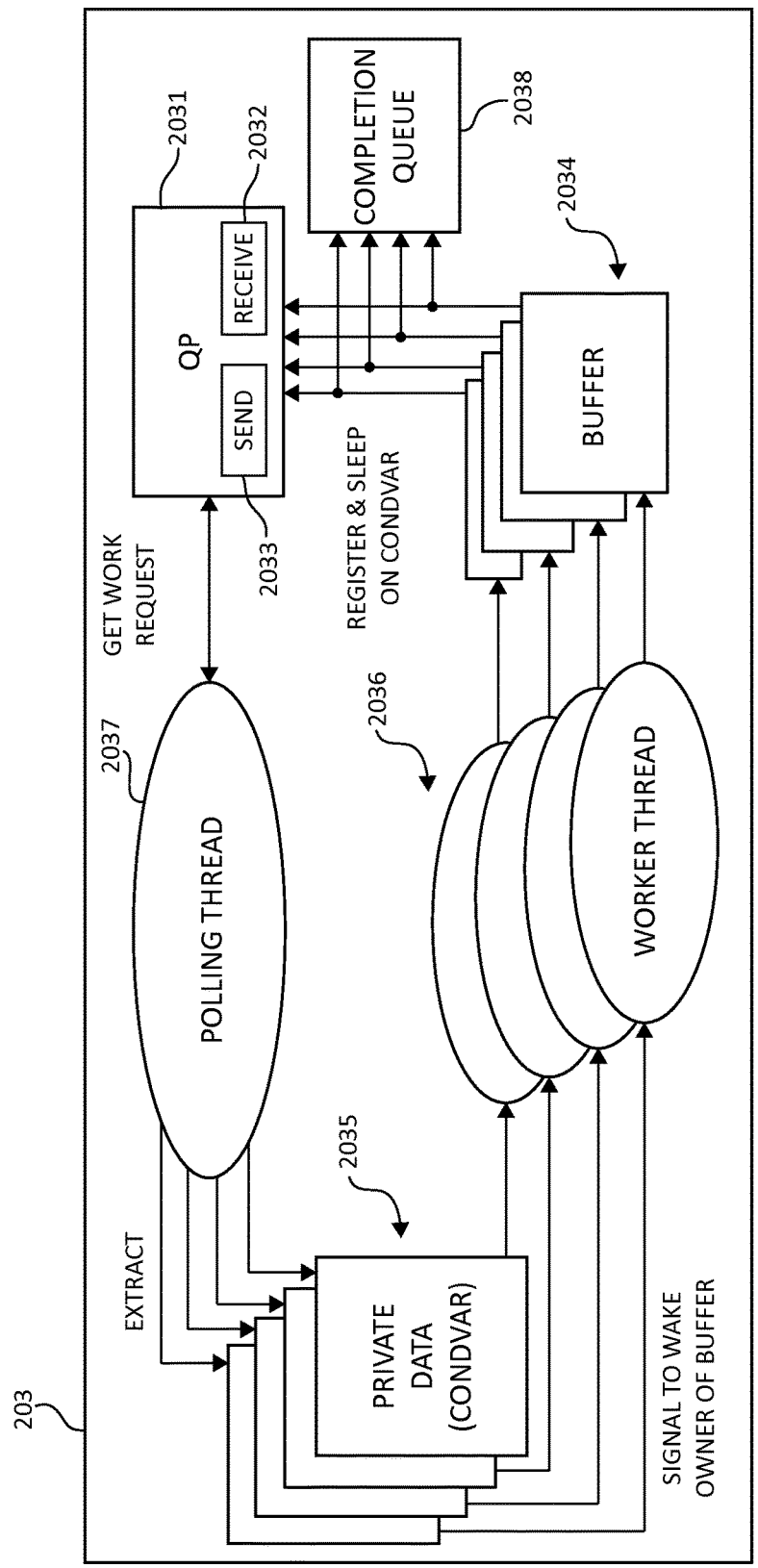
FIG. 3 is a block diagram of one embodiment of a RDMA module that forms a portion of the data processing system of FIG. 2.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which the various embodiments may be implemented. That is, many modifications to the depicted environments may be made.

FIG. 1 illustrates a representation of a network of data processing network 100 in which illustrative embodiments may be implemented. As illustrated in FIG. 1, network data processing network 100 comprises a network of computers and other devices in which various embodiments may be implemented. At least in the illustrated embodiment, network data processing network 100 includes a network 102 coupling a plurality of servers (e.g., servers 104 and 106), a storage system 108, and a plurality of client devices (e.g., client devices 110, 112, and 114) to one another.

Network 102 is a medium used to provide communication links between servers 104 and 106, storage system 108, clients 110, 112, and 114, and various other devices that may be connected together within network data processing network 100. Network 102 may include connections, such as wire, wireless communication links, and/or fiber optic cables. In addition, network 102 may transmit data at a speed of, for example, ten gigabits per second or higher. Network 102 may be or form at least a portion of a local area network (LAN), a wide area network (WAN), storage area network (SAN), or other similar network. That is, network 102 may be any network known in the art or developed in the future.

In one embodiment, network data processing network 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, network data processing network 100 also may be implemented as a number of different types of networks, such as for example, an intranet, a local area network (LAN), or a wide area network (WAN).

Server 104 and server 106 are server computing devices with high-speed connections to network 102. Further, server 104 and server 106 may transfer data between server 104 and server 106 and/or transfer data to client devices 110, 112, and 114 using a remote direct memory access (RDMA) protocol, such as InfiniBand®, remote direct memory access-over-Ethernet, remote direct memory access-over-internet protocol (IP), virtual interface (VI), or any other type of RDMA protocol. For example, server 104 may use a RDMA device, such as a network input/output (I/O) adapter, to transfer data directly into a user application queue in a system memory address space of client 110 from a system memory address space of server 104, without utilizing a central processing unit. The system memory address space may include, for example, internal random access memory (RAM) and/or a larger scale external direct access storage device, such as storage system 108.

In addition, server 104 and server 106 may provide, for example, data feed services, such as financial, news, sports, gaming, or any other type of data feed service that streams updated data on a real time basis, to client devices. However, it should be noted that server 104 and server 106 may provide any type of data to client devices 110, 112, and 114.

Storage system 108 may be any type of storage device(s) known in the art or developed in the future. In one embodiment, is a network storage device capable of storing data in a structured or unstructured format. In addition, storage system 108 may include hard disk drive (HDD) devices, which may be configured in a redundant array of independent disks (RAID), or JBOD (just a bunch of disks), and/or other storage configuration.

Client devices 110, 112, and 114 are clients to server 104 and/or server 106. In the depicted embodiment, server 104 and server 106 may provide information, such as boot files, operating system images, and applications to client devices 110, 112, and 114. Client devices 110, 112, and 114 are data processing systems, such as, for example, network computers, personal computers, laptop computers, handheld computers, personal digital assistants, smart phones, gaming devices, and/or the like computing devices. Users may utilize client devices 110, 112, and 114 to receive and view data provided by server 104 and/or server 106. Furthermore, it should be noted that network data processing network 100 may include additional server devices, storage systems, and client devices and/or other devices not shown in FIG. 1.

Program code located in network data processing network 100 may be stored on a computer-readable storage medium and downloaded to a computer or other computing device for use. For example, program code may be stored on a computer-readable storage medium on server 104 and downloaded to client device 110 over network 102 for use on client device 110.

FIG. 1 is intended as an example, and not as an architectural limitation for the different illustrative embodiments. That is, various embodiments of data processing network 100 include different architectural configurations.

With reference now to FIG. 2, FIG. 2 is a diagram of one embodiment of a data processing system 200. Data processing system 200 is an example of a computer, such as server 104 or server 106 in FIG. 1, in which computer-readable program code and/or instructions implementing processes of illustrative embodiments may be located. In this illustrative example, data processing system 200 includes a communications fabric 202 that provides communications between one or more RDMA modules 203, a processor unit 204, a memory 206, a persistent storage 208, a communications unit 212, an input/output (I/O) unit 214, and a display 216.

A bus system may be used to implement communications fabric 202 and may be comprised of one or more buses, such as a system bus or an input/output bus. Of course, the bus system may be implemented using any suitable type of architecture that provides for a transfer of data between different components and/or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In various embodiments, each RDMA module 203 is a hardware component that connects data processing system 200 to a network, such as network 102 in FIG. 1. Each RDMA module 203 may be, for example, a network input/output card, a network input/output adapter, a network interface card, a network interface controller, or other similar device. In addition, each RDMA module 203 includes a set of one or more processors that provide the data processing capabilities of each RDMA module 203. Further, each RDMA module 203 allows for directly accessing data in user application memory on a remote data processing system in which data processing system 200 specifies the specific address location within the user application memory corresponding to the data to be accessed and transferred. Also, each RDMA module 203 allows the direct transfer of the data from the remote data processing system into specific address locations within memory 206 without interrupting the processing of processor unit 204.

As shown in FIG. 3, RDMA module 203 includes one or more queue pairs (QPs) 2031 in which each QP 2031 comprises a receive queue 2032 and a send queue 2033 for sending data to other computing devices in data network 100. Receive queue 2032 is configured for receiving work requests (e.g., read requests and write requests) for storage device 218 (see FIG. 2). Receive queue 2032 includes an associated plurality of buffers 2034. For example, receive queue 2032 may include 32,000 buffers 2034, however, only four buffers 2034 are shown in FIG. 3 for convenience purposes.

Each buffer 2034 may store one data packet or data element. Each buffer 2034 is a region of a physical memory storage device used to temporarily store data while the data is being moved from one location to another. In other words, receive queue 2032 is a staging area for currently received work requests within RDMA module 203 before RDMA controller 220 transfers a predetermined number of work requests called for by a particular application running on data processing system 200 to memory 206 from receive queue 2032.

RDMA module 203 further includes a plurality of condvars 2035 (conditional elements) or private data associated with a plurality of worker threads 2036. That is, each condvar 2035 is associated with a respective worker thread 2036 such that there is a one-to-one ratio of condvars 2035 to worker threads 2036. Each condvar 2035 is a binary semaphore that is utilized to awaken the associated worker thread 2035 so that the worker thread 2036 can perform as specific task, as discussed below. That is, each condvar 2035 has a first state (e.g, a "0" or a "1") that causes the associated worker thread 2036 to awaken and a second state (e.g., respectively, a "1" or a "0") that causes the associated worker thread 2036 to sleep. In other words, each condvar 2035 is used to block an associated worker thread 2036 from performing tasks on a buffer 2034 until the condvar is instructed to awaken the worker thread 2036.

Each worker thread 2036 is associated with a respective buffer 2034. That is, each worker thread 2036 is associated with a respective buffer 2034 such that there is a one-to-one ratio of worker threads 2036 to buffers 2034. Each worker thread 2036 is configured to perform the work requests received by QP 2031 in receive queue 2032. That is, each worker thread 2036 is configured to read data from and/or write data to the associated buffer 2034 based on the destination of a work request in receive queue 2032. Upon completion of a work request, each worker thread 2036 is configured to register or reregister buffer 2034 with QP 2031, to return to sleep state, and optionally notify a completion queue 2038 that the work request is completed.

RDMA module 203 also comprises a polling thread 2037 in communication with QP 2031 and with each convar 2035. Polling thread 2037 is configured for continuously polling (i.e., a busy/wait polling), substantially continuously polling, or intermittently polling receive queue 2032 to determine if QP 2031 has received any work requests (e.g., read requests or write requests) for one of buffers 2034. If there are no work requests in receive queue 2032, polling thread 2037 continuously polls, substantially continuously polls, or intermittently polls receive queue 2032.

When receive queue 2032 includes a work request for one of buffers 2034, polling thread 2037 extracts a scatter/gather element (SGE) in each work request to identify to which buffer 2034 the work request is addressed. That is, the SGE is a pointer to a particular buffer, which identifies the appropriate buffer 2034.

Once the appropriate buffer 2034 is identified, polling thread 2037 determines which condvar 2035 is responsible for awakening a worker thread 2036 assigned to perform work requests on the appropriate buffer 2034 and notifies the appropriate condvar 2035. The polling thread 2037 may additionally transmit a local key for the buffer 2034 to the worker thread 2036 or include the remote key for the buffer 2034 so that the worker thread 2036 is able to perform the work request on the buffer 2034.

RDMA module 203 also comprises a completion queue 2038 coupled to each buffer 2034. Completion queue 2038 is configured to receive notification from worker thread 2036 that the work request is completed and, in response thereto, notify the entity that transmitted the work request that the work request is complete.

The following is one non-limiting example of the operation of RDMA module 203 in accordance with one embodiment. Each of the buffers 2034 is registered with QP 2031 and is assigned ownership with a respective worker thread 2036. Furthermore, a separate condvar 2035 is assigned to each respective worker thread 2036.

QP 2031 receives a work request (e.g., a read request or write request) from client device 110 and places the work request in receive queue 2032. Polling thread 2037, while continuously polling receive queue 2032, determines that receive queue 2032 includes the work request. Polling thread 2037 extracts the SGE from the work request and identifies the buffer 2034 to which the work request is addressed based on the SGE and signals the condvar 2035 assigned to the worker thread 2036 that is the owner of the identified buffer 2034 to awaken the worker thread 2036 (i.e., change the state of the worker thread 2036 from a sleep state to an awake state).

Worker thread 2036, once awakened, performs the work request on the buffer 2034 that it owns (i.e., the identified buffer). That is, the worker thread 2036 reads data from or writes data to the buffer 2034. Upon completion of the read request or the write request, the worker thread 2036 registers (or reregisters) the buffer 2034 with QP 2031 and the condvar 2035 changes the state of the worker thread 2036 to the sleep state.

Optionally, the worker thread 2036 transmits a completion notification to the completion queue 2038. Here, completion queue 2038 is used to notify client device 110 that the work request is complete.

Polling thread 2037 continues to poll receive queue 2032 for work requests and the process is repeated for each work request received by QP 2031. Since a different worker thread 2036 owns each buffer 2034, latency is minimized because polling thread 2037 does not need to perform any scheduling actions and there are no event driven interrupts. That is, the architecture of RDMA module 203 enables each worker thread 2036 to operate independently of each other in performing read requests and write requests on their respective associated buffers 2034, which negates the need for scheduling work requests and/or needing event driven interrupts when performing multiple work requests.

Returning to FIG. 2, processor unit 204 serves to execute instructions for software applications or programs that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 218. A storage device is any piece of hardware that is capable of storing information, such as, for example, without limitation, data, program code in functional form, and/or other suitable information either on a transient basis and/or a persistent basis. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable flash drive may be used for persistent storage 208.

In this example, persistent storage 208 stores a RDMA controller 220. RDMA controller 220 is a RDMA software program. Data processing system 200 uses RDMA controller 220 to monitor and control RDMA operations associated with RDMA module 203.

Communications unit 212, in this example, also provides for communication with other data processing systems or devices. Communications unit 212 may be, for example, a modem. However, it should be noted that communications unit 212 may provide communications through the use of either or both physical and wireless communications links.

Input/output unit 214 allows for the input and output of data with other devices that may be connected to data processing system 200. For example, input/output unit 214 may provide a connection for user input through a keyboard, a mouse, and/or some other suitable input device. Further, input/output unit 214 may send output to a printer. Display 216 provides a mechanism to display information to a user.

Instructions for the operating system, applications, and/or programs may be located in storage devices 218, which are in communication with processor unit 204 through communications fabric 202. In this illustrative example, the instructions are in a functional form on persistent storage 208. These instructions may be loaded into memory 206 for running by processor unit 204 and RDMA module 203.

The processes of the different embodiments may be performed by a RDMA module 203 using computer implemented instructions, which may be located in a memory, such as memory 206. These instructions are referred to as program code, computer usable program code, or computer-readable program code that may be read and run by RDMA module 203. The program code, in the different embodiments, may be embodied on different physical or computer-readable storage media, such as memory 206 or persistent storage 208.

Program code 222 is located in a functional form on computer-readable media 224 that is selectively removable and may be loaded onto or transferred to data processing system 200 for running by processor unit 204 and RDMA module 203. Program code 222 and computer-readable media 224 form computer program product 226. In one example, computer-readable media 224 may be computer-readable storage media 228 or computer-readable signal media 230. Computer-readable storage media 228 may include, for example, an optical or magnetic disc that is inserted or placed into a drive or other device that is part of persistent storage 208 for transfer onto a storage device, such as a flash drive, that is part of persistent storage 208. Computer-readable storage media 228 also may take the form of a persistent storage, such as a hard drive, a thumb drive, or a flash memory that is connected to data processing system 200. In some instances, computer-readable storage media 228 may not be removable from data processing system 200.

Alternatively, program code 222 may be transferred to data processing system 200 using computer-readable signal media 230. Computer-readable signal media 230 may be, for example, a propagated data signal containing program code 222. For example, computer-readable signal media 230 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer-readable media also may take the form of non-tangible media, such as communication links or wireless transmissions containing the program code.

In some illustrative embodiments, program code 222 may be downloaded over a network to persistent storage 208 from another device or data processing system through computer-readable signal media 230 for use within data processing system 200. For instance, program code stored in a computer-readable storage media in a server data processing system may be downloaded over a network from the server to data processing system 200. The data processing system providing program code 222 may be a server computer, a client computer, or some other device capable of storing and transmitting program code 222.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer-readable media 224 are examples of storage devices in a tangible form.

Figure 4:
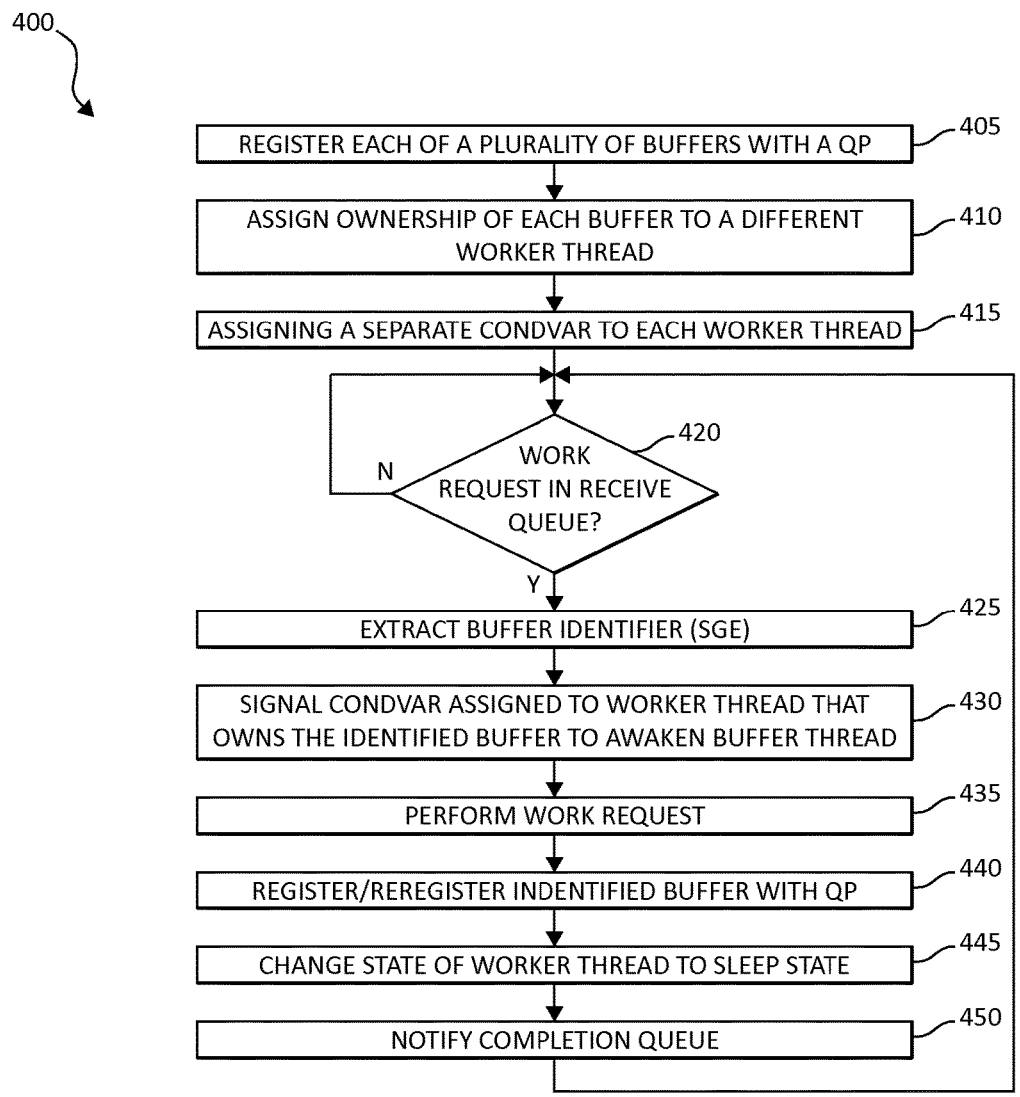
FIG. 4 is a flow diagram of one embodiment of a method for managing data in a computing environment.

With reference now to FIG. 4, FIG. 4 is a flow diagram of one embodiment of a method 400 for managing data in a computing environment (e.g., data processing network 100). At least in the illustrated embodiment, method 400 begins by registering each buffer (e.g., buffers 2034) in a plurality of buffers 2034 with a QP (e.g., QP 2031) (block 405) and assigning ownership of each buffer with a different worker thread (e.g., worker threads 2036) (block 410). Method 400 also includes assigning a separate condvar (e.g., condvars 2035) to each respective worker thread (block 415).

In one embodiment, method 400 includes polling (e.g., continuously polling, substantially continuously polling, or intermittently polling), by a polling thread (e.g., polling thread 2037), a receive queue (e.g., receive queue 2032) to determine if the receive queue includes a work request (e.g., a read request or a write request) for one of the buffers (block 420). If the receive queue does not include a work request, the polling thread continues to poll the receive queue (block 420).

If the receive queue includes a work request, method 400 includes the polling thread extracting the SGE from the work request and identifying the buffer to which the work request is addressed based on the SGE (block 425). The polling thread also signals the condvar assigned to the worker thread that is the owner of the identified buffer to awaken the worker thread (i.e., change the state of the worker thread from a sleep state to an awake state) (block 430).

After the worker thread is awakened, the worker thread performs the work request on the buffer that it owns (i.e., the identified buffer) (block 435). That is, the worker thread reads data from or writes data to the buffer.

Upon completion of the read request or the write request, the worker thread registers (or reregisters) the buffer with the QP 2031 (block 440) and the condvar changes the state of the worker thread to the sleep state (block 445). The worker thread, in one embodiment, transmits a completion notification to a completion queue (e.g., completion queue 2038) (block 450). Here, the completion queue is used to notify the entity that transmitted the work request to the QP that the work request is complete.

The polling thread continues to poll the receive queue for work requests (block 420) and the above-discussed process is repeated for each work request received by the QP. That is, method 400 includes repeating blocks 420-450 so that each request work request is independently performed with a minimum amount of latency.

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device or physical device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for managing data in a computing environment including one or more host computing devices coupled to a storage system comprising a server and storage elements via a network, said method comprising:
registering a plurality of buffers with a work queue in the server;
assigning ownership of each of the plurality of buffers to a different working thread in a plurality of working threads such that each working thread is assigned ownership of, and therefore performs only work requests associated with, a respective associated buffer, the buffer comprising a specific region of physical memory in the server;
continuously polling in lieu of polling at predetermined intervals, by a polling thread in the server, the work queue to determine when the work requests are received by the work queue;
upon receipt of each work request, determining which buffer among the plurality of buffers each work request is associated by extracting identifying elements from each work request by the polling thread to identify flail the respective associated buffer each work request is addressed to; and
performing each work request on each respective associated buffer by a working thread among the plurality of working threads that owns each respective associated buffer.

2. The method of claim 1, further comprising:
retrieving a conditional variable (condvar) associated with a particular working thread that owns the identified respective associated buffer; and
modifying the condvar a first time to awaken the particular working thread from a sleep condition so that the particular working thread is able to perform the work request.

3. The method of claim 2, further comprising:
modifying the condvar a second time subsequent to the particular thread performing the work request to return the particular thread to the sleep condition; and
reregistering the identified respective associated buffer with the work queue.

4. The method of claim 3, further comprising sending a completion notice, via a completion queue in the server, to an entity that transmitted the work request.

5. The method of claim 1, wherein extracting identifying elements comprises extracting scatter/gather elements for the respective associated buffer.

6. The method of claim 1, wherein:
the work queue is a queue pair comprising a send queue and a receive queue, and
continuously polling comprises continuously polling the receive queue for Remote Direct Memory Access (RDMA) read requests and RDMA write requests.

7. A system for managing data in a computing environment, comprising:
one or more host computing devices; and
a storage system comprising a server and storage elements coupled to each of the host computing devices via a network, the server comprising a plurality of buffers and a work queue coupled to a processor, the processor configured for:
registering the plurality of buffers with the work queue in the server,
assigning ownership of each of the plurality of buffers to a different working thread in a plurality of working threads such that each working thread is assigned ownership of, and therefore performs only work requests associated with, a respective associated buffer, the buffer comprising a specific region of physical memory in the server, continuously polling in lieu of polling at predetermined intervals, by a polling thread, the work queue to determine when the work requests are received by the work queue, upon receipt of each work request, determining which buffer among the plurality of buffers each work request is associated by extracting identifying elements from each work request by the polling thread to identify flail the respective associated buffer each work request is addressed to, and performing each work request on each respective associated buffer by a working thread among the plurality of working threads that owns each respective associated buffer.

8. The system of claim 7, wherein the processor is further configured for:

retrieving a conditional variable (condvar) associated with a particular working thread that owns the identified respective associated buffer; and modifying the condvar a first time to awaken the particular working thread from a sleep condition so that the particular working thread is able to perform the work request.

9. The system of claim 8, wherein the processor is further configured for:

modifying the condvar a second time subsequent to the particular thread performing the work request to return the particular thread to the sleep condition; and reregistering the identified respective associated buffer with the work queue.

10. The system of claim 9, wherein the processor is further configured for sending a completion notice, via a completion queue in the server, to an entity that transmitted the work request.

11. The system of claim 7, wherein, when extracting the identifying elements, the processor is configured for extracting scatter/gather elements for the respective associated buffer.

12. The system of claim 7, wherein:

the work queue is a queue pair comprising a send queue and a receive queue, and when continuously polling, the processor is configured for continuously polling the receive queue for Remote Direct Memory Access (RDMA) read requests and RDMA write requests.

13. A physical computer storage medium comprising a computer program product for managing data in a computing environment including one or more host computing devices coupled to a storage system comprising a server and storage elements via a network, said physical computer storage medium comprising:

computer code for registering a plurality of buffers with a work queue in the server;

computer code for assigning ownership of each of the plurality of buffers to a different working thread in a plurality of working threads such that each working thread is assigned ownership of, and therefore performs only work requests associated with, a respective associated buffer, the buffer comprising a specific region of physical memory in the server;

computer code for continuously polling in lieu of polling at predetermined intervals, by a polling thread in the server, the work queue to determine when the work requests are received by the work queue;

computer code for, upon receipt of each work request, determining which buffer among the plurality of buffers each work request is associated by extracting identifying elements from each work request by the polling thread to identify the respective associated buffer each work request is addressed to; and computer code for performing each work request on each respective associated buffer by a working thread among the plurality of working threads that owns each respective associated buffer.

14. The physical computer storage medium of claim 13, wherein the computer code for determining which buffer among the plurality of buffers each work request is associated comprises computer code for extracting scatter/gather elements from each work request to identify the respective associated buffer.

15. The physical computer storage medium of claim 14, further comprising:

computer code for retrieving a conditional variable (condvar) associated with a particular working thread that owns the identified respective associated buffer; and computer code for modifying the condvar a first time to awaken the particular working thread from a sleep condition so that the particular working thread is able to perform the work request.

16. The physical computer storage medium of claim 15, further comprising:

computer code for modifying the condvar a second time subsequent to the particular thread performing the work request to return the particular thread to the sleep condition; and computer code for reregistering the identified respective associated buffer with the work queue.

17. The physical computer storage medium of claim 16, further comprising computer code for sending a completion notice, via a completion queue in the server, to an entity that transmitted the work request.

18. The physical computer storage medium of claim 13, wherein the work queue is a queue pair comprising a send queue and a receive queue, and wherein the computer code for continuously polling comprises computer code for continuously polling the receive queue for Remote Direct Memory Access (RDMA) read requests and RDMA write requests.

* * * * *